United States Patent
Stokes et al.

(10) Patent No.: US 12,310,378 B2
(45) Date of Patent: May 27, 2025

(54) PRODUCE PROCESSING DOSING SYSTEM

(71) Applicant: JBT Marel Corporation, Chicago, IL (US)

(72) Inventors: Jonathan M. Stokes, Clovis, CA (US); Curtis L. Schulz, Highland, CA (US)

(73) Assignee: JBT Marel Corporation, Chicago, IL (US)

( * ) Notice: Subject to any disclaimer, the term of this patent is extended or adjusted under 35 U.S.C. 154(b) by 798 days.

(21) Appl. No.: 17/304,485

(22) Filed: Jun. 22, 2021

(65) Prior Publication Data

US 2021/0401003 A1 Dec. 30, 2021

Related U.S. Application Data

(60) Provisional application No. 63/045,533, filed on Jun. 29, 2020.

(51) Int. Cl.
| | |
|---|---|
| *A01M 7/00* | (2006.01) |
| *A23B 2/792* | (2025.01) |
| *A23B 7/00* | (2006.01) |
| *A23B 7/158* | (2006.01) |
| *A23B 7/16* | (2006.01) |

(52) U.S. Cl.
CPC ........... *A23B 2/792* (2025.01); *A01M 7/0014* (2013.01); *A23B 7/158* (2013.01); *A01M 7/0032* (2013.01); *A23B 7/16* (2013.01)

(58) Field of Classification Search
CPC .............. A01M 7/0014; A01M 7/0017; A01M 7/0025; A01M 7/0032; A23B 7/158; A23B 7/153; A23B 7/16
USPC .......... 99/487, 516, 534; 118/300, 321, 323; 239/77, 103, 149, 146
See application file for complete search history.

(56) References Cited

U.S. PATENT DOCUMENTS 3,865,308 A * 2/1975 Pringle ................... B05B 15/25
222/134
3,899,106 A * 8/1975 Danquechin Dorval .....................
A01M 7/0089
222/614
3,926,371 A * 12/1975 Harrell ................ A01M 7/0092
239/304

(Continued)

FOREIGN PATENT DOCUMENTS

DE 102010023380 A1 * 12/2011 .......... A01M 7/0092
EP 1 255 451 A1 11/2002

(Continued)

OTHER PUBLICATIONS

International Search Report and Written Opinion mailed Oct. 18, 2021, issued in corresponding International Application No. PCT/US2021/039101, filed Jun. 25, 2021, 12 pages.

*Primary Examiner* — Reginald Alexander
(74) *Attorney, Agent, or Firm* — Christensen O'Connor Johnson Kindness PLLC

(57) ABSTRACT

A system (10) for treating produce includes an application system (12) for applying a treatment liquid to the produce. A piston pump (20) is connected in liquid flow receiving communication with a source of treatment liquid (16), and also is connected in liquid flow expelling communication with an application line (18) leading to the application system. A control system (22) controls the operation of the piston pump to pump a selected dosage of the treatment liquid from the source of treatment liquid (16) to the application system (12).

11 Claims, 4 Drawing Sheets

(56) References Cited

U.S. PATENT DOCUMENTS

| | | | |
|---|---|---|---|
| 4,078,480 A * | 3/1978 | Luck | A23B 7/148 |
| | | | 99/476 |
| 4,856,683 A * | 8/1989 | Beaston | B05B 9/0403 |
| | | | 366/137 |
| 5,027,742 A * | 7/1991 | Lee | B05B 7/32 |
| | | | 239/10 |
| 5,148,738 A * | 9/1992 | Orman | A23B 7/154 |
| | | | 99/626 |
| 5,248,448 A * | 9/1993 | Waldron | B05B 7/10 |
| | | | 261/78.2 |
| 5,502,685 A * | 3/1996 | Orlando | A01M 7/0092 |
| | | | 366/132 |
| 5,911,339 A * | 6/1999 | Peterson | G05D 7/0676 |
| | | | 99/452 |
| 6,206,968 B1 | 3/2001 | Minges | |
| 6,506,030 B1 | 1/2003 | Kottke | |
| 6,840,404 B1 | 1/2005 | Schultz et al. | |
| 6,866,163 B2 | 3/2005 | McGill | |
| 6,997,356 B2 | 2/2006 | McGill | |
| 7,156,260 B2 | 1/2007 | Hayduk | |
| 7,261,224 B2 | 8/2007 | Cohen et al. | |
| 7,337,920 B2 | 3/2008 | Duck et al. | |
| 7,708,535 B2 | 5/2010 | Peeler et al. | |
| 7,726,516 B2 | 6/2010 | Engel | |
| 7,828,474 B2 | 11/2010 | Ishizuka et al. | |
| 7,997,446 B2 | 8/2011 | Engel | |
| 8,109,739 B2 | 2/2012 | Wrench et al. | |
| 8,359,820 B2 * | 1/2013 | Dohrmann | A01D 43/14 |
| | | | 56/16.8 |
| 9,278,367 B2 | 3/2016 | Cooper | |
| 9,341,641 B2 | 5/2016 | Boehm et al. | |
| 9,440,205 B1 | 9/2016 | Miller et al. | |
| 9,605,664 B2 | 3/2017 | Seith | |
| 9,850,460 B2 | 12/2017 | Middleton et al. | |
| 10,173,232 B2 | 1/2019 | Van Keulen | |
| 10,330,693 B2 | 6/2019 | Boehm et al. | |
| 10,578,634 B2 | 3/2020 | Lehtonen et al. | |
| 10,603,428 B2 | 3/2020 | Weibel | |
| 10,627,047 B2 | 4/2020 | Karlsson | |
| 10,653,442 B2 | 5/2020 | Anand et al. | |
| 11,737,446 B2 * | 8/2023 | Ridings | A01M 7/0017 |
| | | | 43/125 |
| 2005/0173463 A1 | 8/2005 | Wesner | |
| 2005/0205616 A1 | 9/2005 | Engel | |
| 2005/0214130 A1 | 9/2005 | Yang | |
| 2005/0254972 A1 | 11/2005 | Baker et al. | |
| 2005/0264625 A1 | 12/2005 | Saruta et al. | |
| 2008/0241323 A1 * | 10/2008 | Kelsey | A61L 2/22 |
| | | | 426/318 |
| 2012/0138628 A1 | 6/2012 | Molitor et al. | |
| 2012/0285564 A1 | 11/2012 | Airaksinen | |
| 2012/0298696 A1 | 11/2012 | Milo et al. | |
| 2012/0325864 A1 | 12/2012 | Imaizumi et al. | |
| 2015/0122914 A1 * | 5/2015 | Zwahlen | A01M 7/0017 |
| | | | 239/373 |
| 2017/0252766 A1 | 9/2017 | Post et al. | |
| 2018/0051694 A1 | 2/2018 | Mirzakhani-Nafchi et al. | |
| 2019/0203702 A1 | 7/2019 | Warren et al. | |
| 2020/0018629 A1 | 1/2020 | Shea-Simonds et al. | |

FOREIGN PATENT DOCUMENTS

| | | | |
|---|---|---|---|
| EP | 1 327 482 A2 | 7/2003 | |
| EP | 1 385 779 B1 | 2/2004 | |
| EP | 1 615 003 B1 | 7/2004 | |
| EP | 1 250 526 B1 | 6/2005 | |
| EP | 1 664 517 B1 | 2/2008 | |
| EP | 1 644 169 B1 | 10/2008 | |
| EP | 2 093 422 A1 | 8/2009 | |
| EP | 1 515 082 B1 | 7/2010 | |
| EP | 2 501 491 A1 | 9/2012 | |
| EP | 2 301 847 B1 | 1/2013 | |
| EP | 2 419 162 B1 | 1/2013 | |
| EP | 2 650 539 A1 | 10/2013 | |
| EP | 2 708 288 A2 | 3/2014 | |
| EP | 2 714 285 A1 | 4/2014 | |
| EP | 3 021 979 A1 | 5/2016 | |
| EP | 2 662 671 B1 | 3/2018 | |
| EP | 088 736 B1 | 6/2018 | |
| EP | 2 891 799 B1 | 10/2018 | |
| EP | 325 925 B1 | 2/2020 | |
| FR | 2213637 A5 * | 8/1974 | A01M 7/0092 |
| WO | 2011/108358 A2 | 9/2011 | |
| WO | 2013/167209 A1 | 11/2013 | |
| WO | 2015/015204 A1 | 2/2015 | |
| WO | 2016/042104 | 3/2016 | |

* cited by examiner

PRODUCE PROCESSING DOSING SYSTEM

CROSS-REFERENCE TO RELATED APPLICATION

This application claims the benefit of U.S. Provisional Application No. 63/045,533, filed Jun. 29, 2020, the entire contents of which are incorporated herein by reference in their entirety.

BACKGROUND

In the processing of produce, including fruits and vegetables, it is commonly necessary to spray fungicides, antipathogenic chemicals, preservative coatings and other substances and treatment solutions on the produce. Currently, this process includes mixing large quantities of treatment chemicals in a large tank (at least 300 to 500 gallons) to achieve the required concentration level(s) and then utilize peristaltic pumps to draw the treatment solution from the mixing tank to supply the solution either to an application tank or an application manifold, which in turn is connected to nozzles or other application equipment used to spray the treatment solution onto the produce. The original treatment chemical(s) is/are often too thick to be drawn in and accurately dosed using a peristaltic pump. Thus, other means must be used to introduce the chemical(s) into the mixing tank. Such mixing protocols require expertise and significant periods of time to mix up the treatment chemicals in specified concentrations. Also, the mixing tanks themselves occupy a large amount of floor space, and such tanks are typically too large to readily to move if needed to do so.

Further, errors can occur in introducing the correct amounts of treatment chemicals into the mixing tank. It is important that the correct concentration of the treatment chemicals be applied to the produce being treated so that certification of such can be made. Accordingly, personnel must be trained to prepare the correct mixture of treatment chemicals each and every time that a new quantity is prepared within the mixing tank. Further, due to human error, the recording of the actual amounts of the treatment chemicals placed in the mixing tank may not be accurate.

The present disclosure seeks to address the foregoing limitations of current methods for preparing correct dosages of chemical solutions used to treat produce, including fruits and vegetables, as well as other food products.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a dosing system is provided for applying at least one treatment liquid to food products. The dosing system includes a piston pump connected in liquid flow communication with a source of treatment liquid, the piston pump also connected in liquid flow communication with an application system for applying the treatment liquid to the produce, and a control system for controlling the operation of the piston pump to pump a selected amount of the treatment liquid from the source of treatment liquid to the application system.

In any of the embodiments described herein, wherein the dosing system further includes an application line connected between at least one piston pump and the application system through which the treatment liquid is transmitted from the piston pump to the application system.

In any of the embodiments described herein, wherein the dosing system further includes a flow control valve between the source of treatment liquid and the piston pump.

In any of the embodiments described herein, wherein the dosing system further includes a flow control valve between the piston pump and the application line.

In any of the embodiments described herein, wherein the dosing system further includes a flow control valve between the piston pump and the application line.

In any of the embodiments described herein, wherein the dosing system further includes an application vessel to receive the treatment liquid from the piston pump.

In any of the embodiments described herein, wherein the dosing system further includes a water source for supplying water to the application vessel for dilution of the treatment liquid received from the piston pump.

In any of the embodiments described herein, wherein the dosing system further includes an application pump for pumping the treatment fluid from the application vessel to the food product being treated.

In any of the embodiments described herein, wherein the dosing system further includes an application vessel connected in liquid flow communication with the application line to receive the treatment liquid from the piston pump.

In any of the embodiments described herein, wherein the dosing system further includes a recirculation pump in communication with the application line to circulate treatment liquid from one location of the application tank to another location of the application tank.

In any of the embodiments described herein, wherein the application vessel includes a recirculation outlet at one location of the application vessel and a recirculation inlet at another location of the application vessel, both the recirculation outlet and inlet being in liquid flow communication with the application line.

In any of the embodiments described herein, wherein the dosing system further includes a mixing apparatus in communication with the application line for mixing the treatment liquid flowing through the application line.

In any of the embodiments described herein, wherein the dosing system includes a plurality of piston pumps, each connected in liquid flow communication with the source of treatment liquid, each of the piston pumps connected in liquid flow communication with the application system.

In any of the embodiments described herein, wherein the source of treatment liquid comprises a storage vessel in flow communication with the piston pump.

In any of the embodiments described herein, wherein the storage vessel includes an agitation system for mixing the treatment liquid in the storage vessel.

In accordance with another embodiment of the present invention, a system is provided for treating produce. The system includes an application system for applying a treatment liquid to produce, a piston pump connected in liquid flow receiving communication with a source of treatment liquid and connected in liquid flow expelling communication with the application system, and a control system for controlling the operation of the piston pump to pump a selected dosage of the treatment liquid from the source of treatment liquid to the application system.

In any of the embodiments described herein, wherein the system further includes an application line connected between at least one piston pump and the application system through which the treatment liquid is transmitted from the piston pump to the application system.

In any of the embodiments described herein, wherein the system further includes a flow control valve between the source of treatment liquid and the piston pump.

In any of the embodiments described herein, wherein the system further includes a flow control valve between the piston pump and the application line.

In any of the embodiments described herein, wherein the system further includes an application vessel to receive the treatment liquid from the piston pump.

In any of the embodiments described herein, wherein the system further includes a water source for supplying water to the application vessel.

In any of the embodiments described herein, wherein the system further includes an application pump for pumping the treatment fluid from the application vessel to the produce being treated.

In any of the embodiments described herein, wherein the system further includes an application vessel connected in liquid flow communication with the application line to receive the treatment liquid from the piston pump.

In any of the embodiments described herein, wherein the system further includes a recirculation pump in communication with the application line to circulate treatment liquid from one location of the application tank to another location of the application tank.

In any of the embodiments described herein, wherein the application vessel includes a recirculation outlet at one location of the vessel and a recirculation inlet at another location of the vessel, both in liquid flow communication with the application line.

In any of the embodiments described herein, wherein the system further includes a mixing apparatus in communication with the application line for mixing the treatment liquid flowing through the application line.

In any of the embodiments described herein, wherein the system includes a plurality of piston pumps, each connected in liquid flow receiving communication with the source of treatment liquid, and each of the piston pumps connected in liquid flow expelling communication with the application system.

In any of the embodiments described herein, wherein the source of treatment liquid includes a storage vessel in flow communication with the piston pump.

In any of the embodiments described herein, wherein the storage vessel includes an agitation system for mixing the treatment liquid in the storage vessel.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
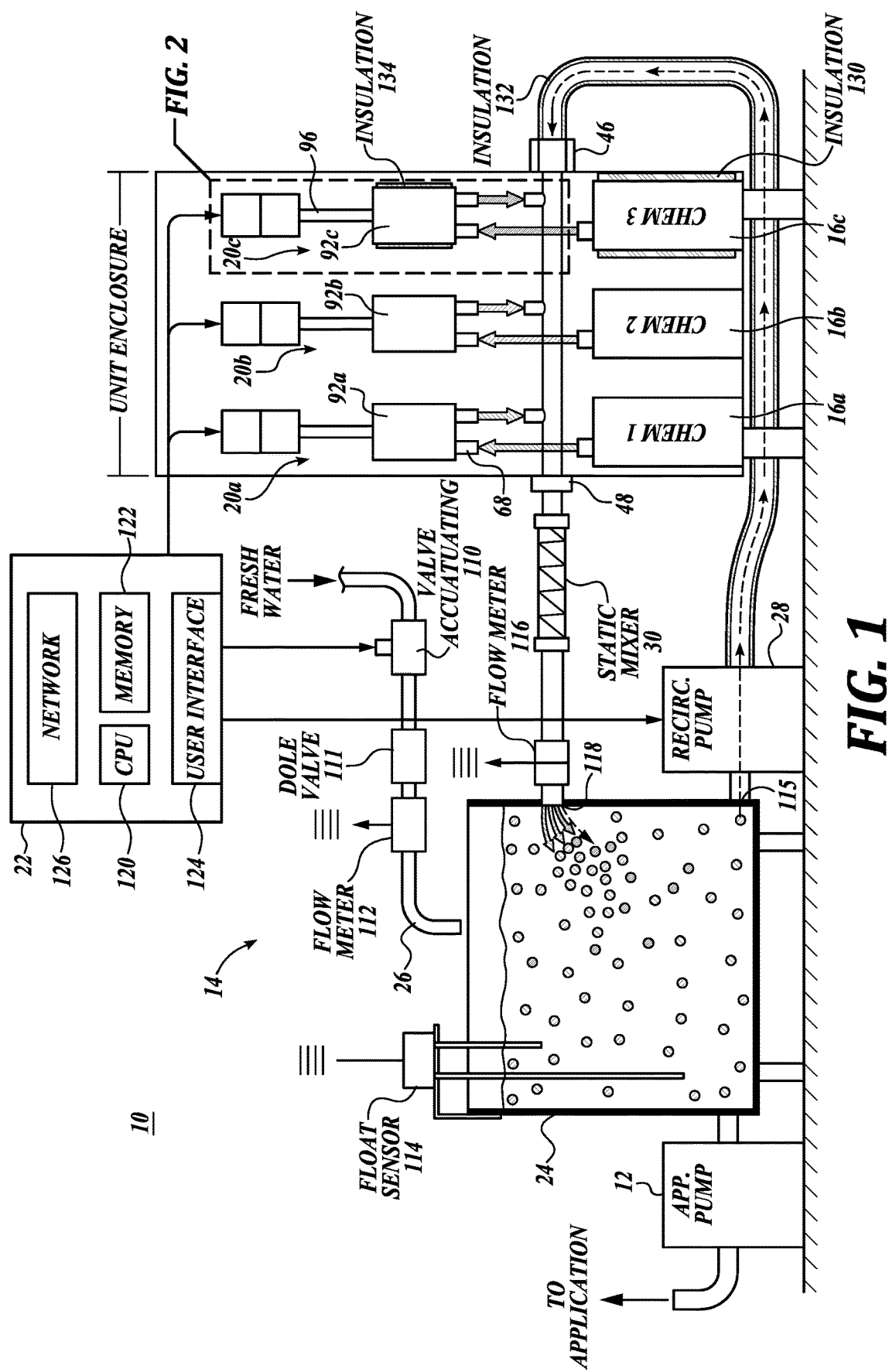
FIG. 1 is a schematic view of a system for applying a treatment solution of the present disclosure and in particular dosing system for the treatment solution of the present disclosure.

The description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed. Similarly, any steps described herein may be interchangeable with other steps, or combinations of steps, in order to achieve the same or substantially similar result.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well known process steps have not been described in detail in order not to unnecessarily obscure various aspects of the present disclosure. Further, it will be appreciated that embodiments of the present disclosure may employ any combination of features described herein.

The present application may include references to "directions," such as "forward," "rearward," "front," "back," "ahead," "behind," "upward," "downward," "above," "below," "horizontal," "vertical," "top," "bottom," "right hand," "left hand," "in," "out," "extended," "advanced," "retracted," "proximal," and "distal." These references and other similar references in the present application are only to assist in helping describe and understand the present disclosure and are not intended to limit the present invention to these directions.

The present application may include modifiers such as the words "generally," "approximately," "about," or "substantially." These terms are meant to serve as modifiers to indicate that the "dimension," "shape," "temperature," "time," or other physical parameter in question need not be exact, but may vary as long as the function that is required to be performed can be carried out. For example, in the phrase "generally circular in shape," the shape need not be exactly circular as long as the required function of the structure in question can be carried out.

The present application refers to "food products." Examples of a food products described in the present application include produce, including fruits and vegetables. However, the present invention can apply other food products, such as nuts, grains or other types of food product.

The present application refers to "treatment liquid," "treatment fluid," "treatment solution," and "treatment mixture." These terms are to be considered to be synonymous.

Also, in the present application reference to "chemical" or "treatment chemical" can refer to a chemical solution or chemical treatment solution or to a chemical mixture or to a chemical treatment mixture.

Referring initially to FIG. 1, a system 10 for treating food products, such as produce, is schematically illustrated. The treatment system 10 involves applying a treatment liquid or solution to the food product. Such treatment liquids/solutions might include, for example, a herbicide, a preservative, an anti-microbial agent, etc. It is important that the treatment liquid/solution be of the proper concentration or "strength" for successful treatment, but also to avoid waste of the treatment chemicals.

As shown in FIG. 1, an application pump 12 supplies the treatment liquid from a dosage system 14 to an applicator (not shown) for applying the treatment liquid to the food products. Such applicator might include spray nozzles, and a manifold for distributing the treatment fluid to the nozzles.

Briefly, the dosage system 14 includes containers 16a, 16b, and 16c in which the treatment chemicals are stored. The treatment chemicals from the storage containers 16a, 16b, and 16c are injected into an application line 18 by a series of piston pumps 20a, 20b, and 20c that are operated under a control system 22. The treatment chemicals injected into the application line 18 flow into a treatment vessel or tank 24. Fresh water to dilute the concentrated treatment chemicals delivered by the application line 18 is routed to the application tank 24 by a water line 26, from a fresh water source. The quantity of water being delivered to the tank is controlled by the controller 22 so that the proper concentration of the treatment liquid in the application tank is maintained. A recirculation pump 28 continually circulates the treatment liquid in the tank 24 past the piston pumps 20a, 20b, and 20c and then back into the tank 24. A static mixer 30 is positioned in the application line 18 downstream of the piston pumps 20a, 20b, and 20c to help ensure that the various treatment chemicals injected into the application line 18 by the pumps 20a, 20b, and 20c are thoroughly mixed prior to entering the application tank 24.

Figure 3:
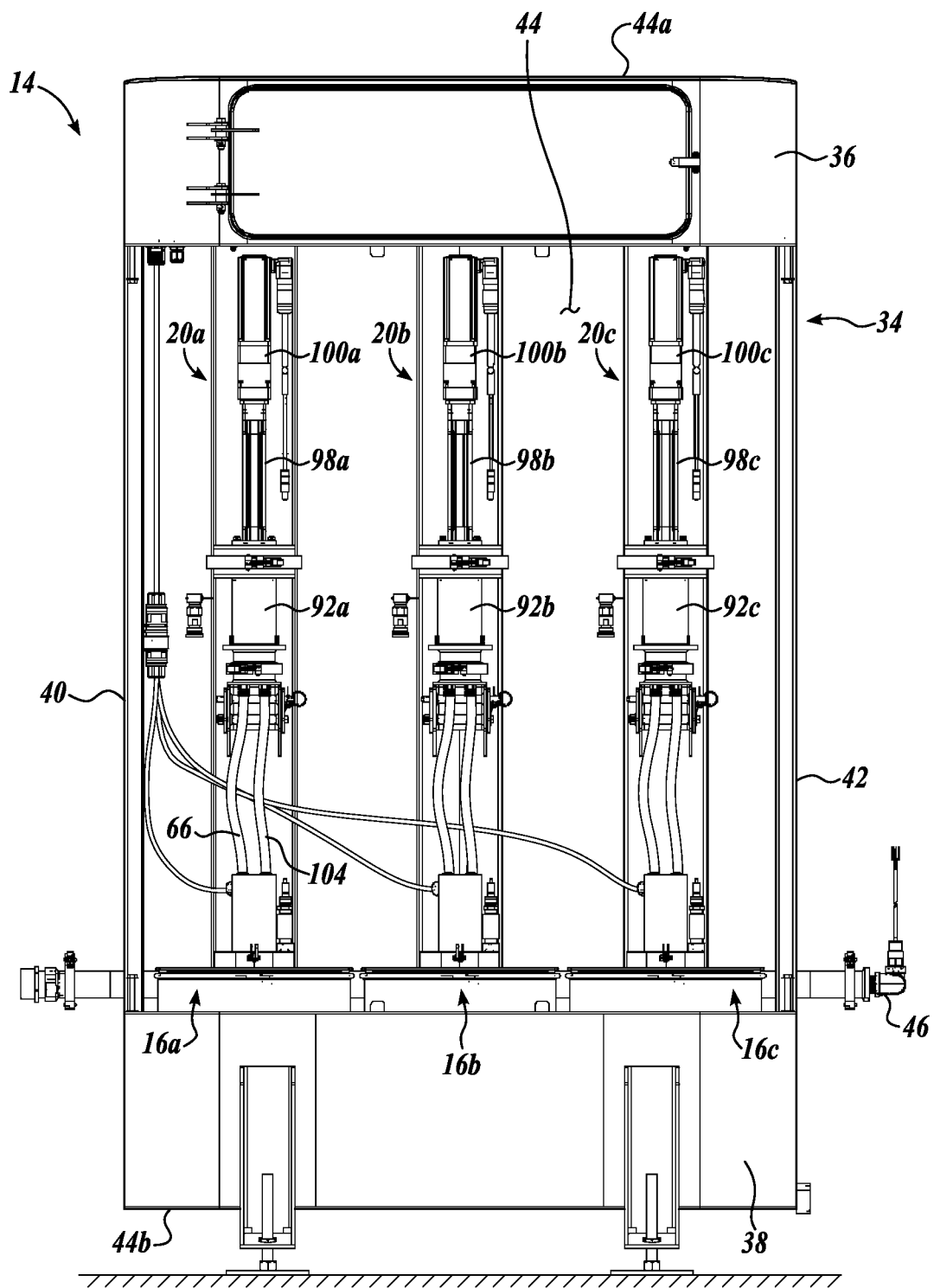
FIG. 3 is a front elevational view of a cabinet that houses components of the dosing system of the present disclosure, with the front doors of the cabinet removed.

Next, additionally referring to FIG. 3, a cabinet 34 is provided to house numerous components of the dosing system 14. As shown in FIG. 3, the cabinet 34 is an upright structure having upper and lower front panels 36 and 38, side panels 40 and 42, a rear panel 44, and top and bottom panels 44a and 44b to form a substantially fully enclosed structure. Closure doors, not shown, are located in the front of the cabinet between the front top panel 36 and bottom panel 38. Such doors are not shown so that the interior of the cabinet may be visible.

The cabinet 34 houses the storage containers 16a, 16b, 16c as well as the piston pumps 20a, 20b, and 20c. The cabinet also houses the control system 22. The cabinet protects these components from excess water or spray as well as from access by unauthorized personnel. Also, a section of the application line 18 with connections to the piston pumps 20a, 20b, and 20c is positioned within the cabinet 34. Fittings or connectors 46 and 48 are provided to interconnect the section of the application line 18 within the cabinet 34 with the remainder of the application line 18.

Figure 4:
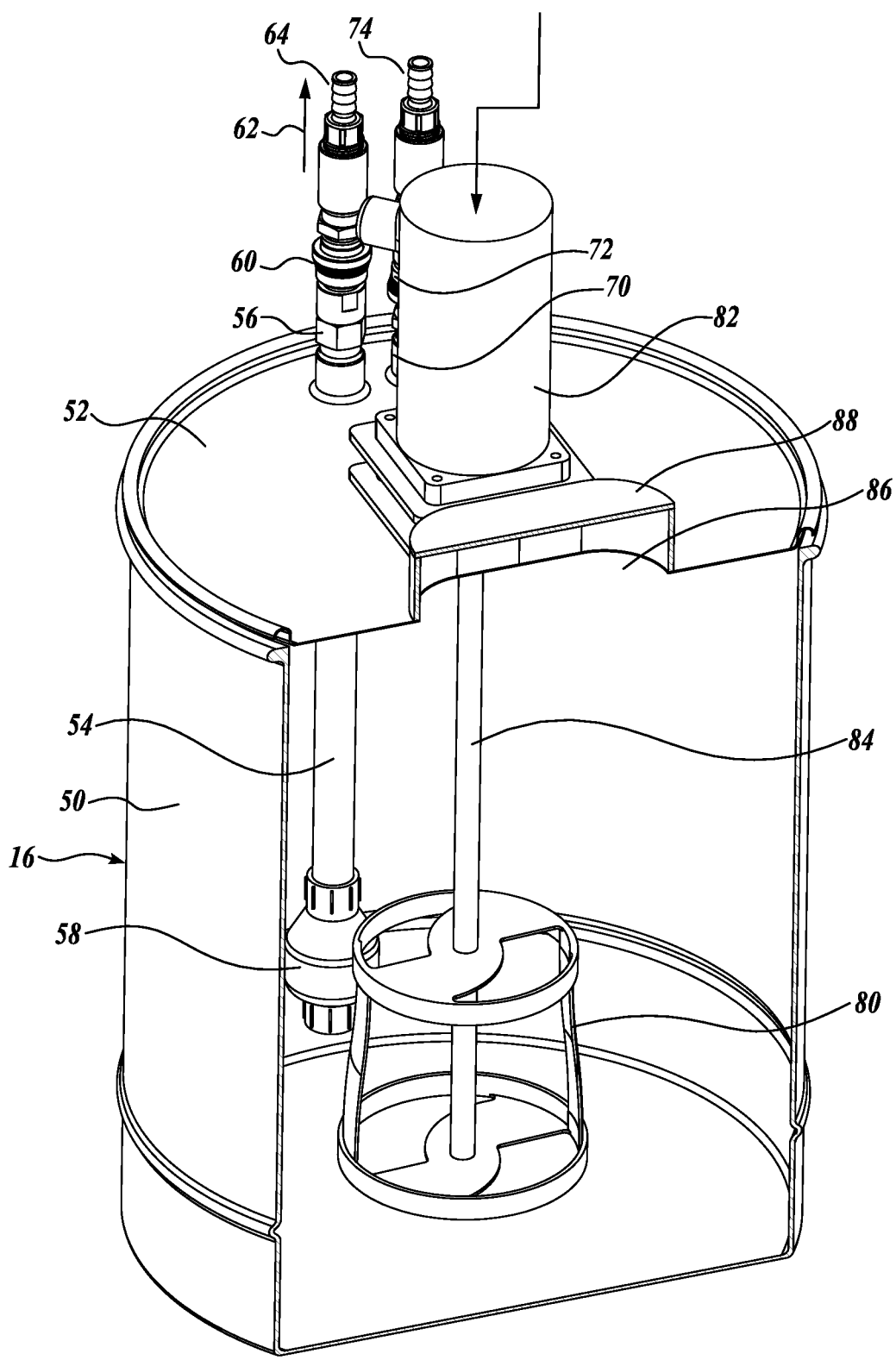
FIG. 4 is an enlarged isometric view of a container for holding a treatment chemical or component with portions of the container cut away to expose the interior of the container.

Next, additionally referring to FIG. 4, a storage container 16 is illustrated as in the form of a cylindrical body 50 and a circular top or lid 52. Of course, the storage container 16 can be of numerous other shapes and constructions. A suction tube 54 extends downwardly into the body 50 from a fitting 56 located just above the lid 52. An inlet nozzle or fitting 58 is connected to the lower end of the suction tube 54 to, among other functions, limit the size of any particulates that might enter the suction tube 54.

A flow control (check) valve 60 is connected to the fitting 56 to limit the direction of flow upwardly in the direction of arrow 62, but not in the reverse (downward) direction. A quick disconnect fitting 64 is positioned above flow control valve 60 so as to be quickly and conveniently connected with line 66 leading to piston pump 20, see FIG. 1. A one-way or check valve 68 is also interposed between the upper end of line 66 and an inlet opening at the piston pump 20.

Referring to FIG. 4, a second fitting 70, flow control valve 72, and quick disconnect fitting 74 are provided for use in flushing the dosing system 14, including the piston pump 20 as described below. As such, the fitting 70 terminates at or just below the lid or cover 52, since the function of the fitting 70 is to return the treatment chemical back into the storage container 16.

The treatment chemical stored in the container 16 may be highly viscous, in which case it may be necessary to continually mix the chemical as well as keep the chemical(s) in suspension. To this end, a double mixer blade structure 80 positioned within the container 16, is powered by an electric motor 82 mounted on the cover or lid 52. A drive shaft 84 extends downwardly from the motor to the mixer blade 80. The operation of the motor 82 is controlled by the control system 22. It is to be understood that other types of mixers can be used in place of structure 80, for example an impeller type mixer.

Also, an opening 86 is provided in the lid 52 with a removable cover 88 through which the container 16 might be refilled as needed. As noted above, the container 16 is positioned within the cabinet 34 so as to be in a protected, secure location.

Figure 2:
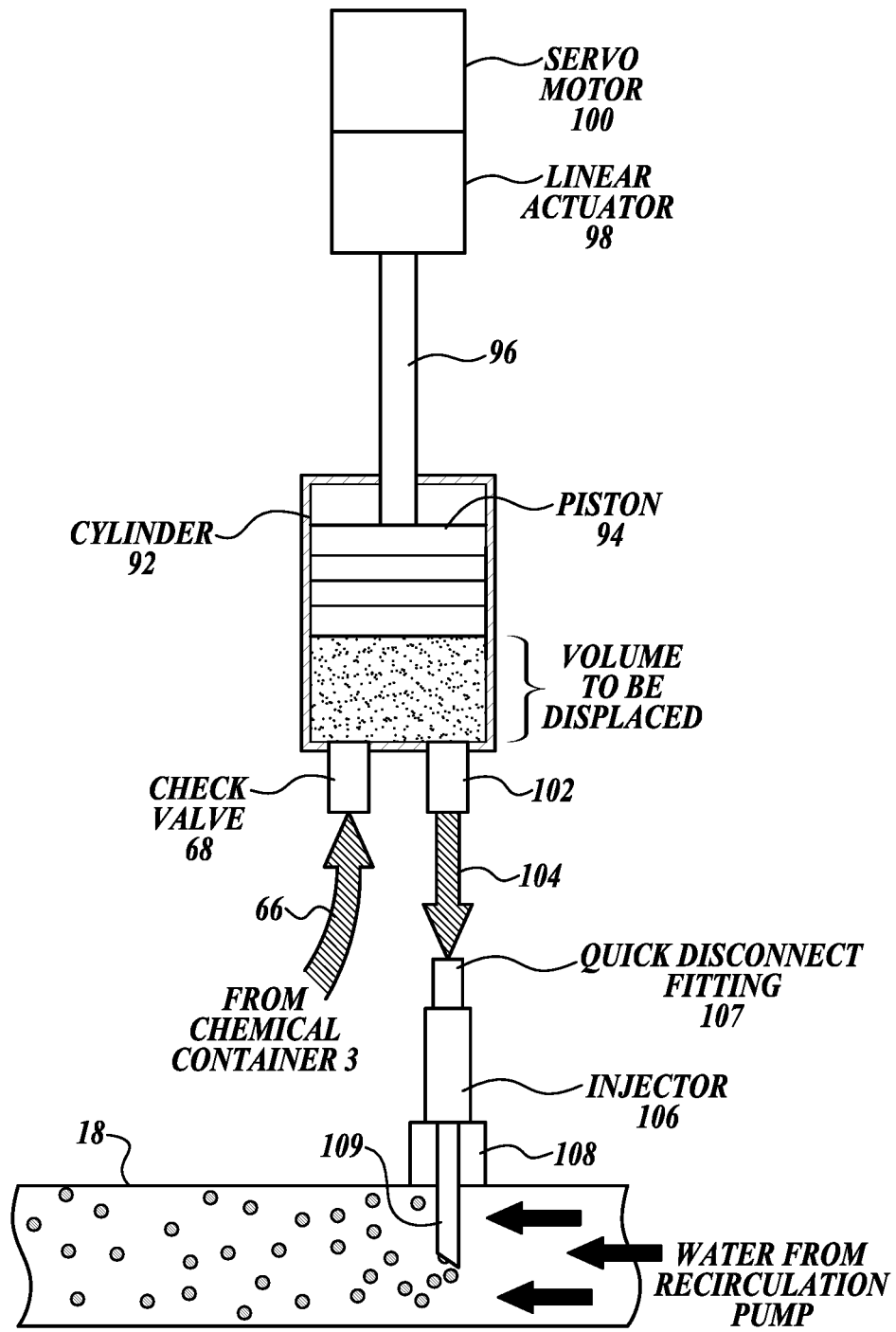
FIG. 2 is an enlarged schematic view of a piston pump used in a dosing system of the present disclosure.

Next, additionally referring to FIG. 2, the piston pump 20 includes a cylinder 92 for housing a piston 94 therein. The piston is reciprocated along the length of the cylinder 92 by a piston rod 96 connected between the piston and a linear actuator 98 that drives the upper end of the piston rod up and down and thus also drives the piston up and down within the cylinder. The linear actuator is powered by an electric motor, such as a servo motor 100. The linear actuator converts the rotational movement of the servo motor to a longitudinal reciprocal movement of the piston rod 96. Linear actuators such as linear actuator 98 and servo motors, such as servo motor 100, are articles of commerce.

An encoder is mounted or built into the servo motor so as to be able to very accurately advance and retract the piston 94 as desired. As such, the stroke of the piston can be set to draw precise amounts of treatment chemicals from the containers 16 and also inject precise amounts of such chemicals into the application line 18.

As noted below, the treatment chemical is drawn into the piston pump 20 from the container 16 through inlet line 66 which is connected to an inlet port of the cylinder 92 through the use of a check valve 68. A check valve 102 is also connected to an outlet port of cylinder 92, which check valve is closed while the treatment chemical is being drawn into the cylinder 92. An outlet line 104 extends between the check valve 102, and an injector 106 which is connected to a fitting 108 in flow communication with the interior of the application line 18.

The injector 106 includes an outlet tip 109 that extends into the interior of the application line 18, as schematically shown in FIG. 2. A quick disconnect coupling 107 is attached to the injector 106 so that the outlet or feed line 104 may be quickly disconnected from the injector 106 and connected to fitting 74 of the container 16 when flushing the cylinder 92, as described below.

As schematically shown in FIG. 1, the piston pumps 20a, 20b, and 20c are controlled by the controller 22. Although the piston pumps are illustrated as being in a vertical orientation, the pumps can be in other orientations, including horizontal or even upside down relative to the position shown in FIGS. 1 and 2.

Also, as shown in FIG. 1, dosing system 14 may include several piston pumps, with three piston pumps 20a, 20b, and 20c being illustrated. Each of these piston pumps can be used to inject a different treatment chemical into the application line 18. Also, a fewer number or a larger number of piston pumps may be utilized relative to the numbers shown in FIGS. 1 and 3.

Further, a plurality piston pumps may be used to inject the same treatment chemical into the application line 18, with the different piston pumps operating in different cycles so that the treatment chemical is injected into the application line in a more continuous basis than if a singular piston pump were utilized for this purpose. Also, it may be that a significant quantity of the treatment chemical is needed to be injected into the treatment line 18 than is possible using a singular piston pump. This requirement can be met by use of two or more piston pumps.

Next, referring specifically to FIGS. 1 and 3, the treatment line 18 stems from an outlet 115 located in a lower portion of the application tank 24 to connect to the inlet of a recirculation pump 28 and then from the outlet of the pump to the connector 46 at cabinet 34. As discussed above, a section of the application line 18 extends through the cabinet to an outlet connector 48. From the outlet connector 48, the application line 18 extends to the inlet side of a static mixer 30. From the outlet of the static mixer 30, the application line next extends to the inlet side of a flow meter 116. From the outlet of the flow meter 116, the application line connects to an inlet 118 located at an upper elevation of the application tank 24. The recirculation pump 28 continually circulates the treatment liquid from the lower portion of the application tank 24 back into an upper portion of the application tank. It may be that no treatment liquid is being pumped from the application tank 24 and/or not treatment chemical is being injected into the application line 18; nonetheless, the recirculation pump continues to operate.

As mentioned above, the static mixer 30 helps to thoroughly mix the treatment chemicals injected into the application line 18 by the piston pumps 20a, 20b, and 20c. Such static mixers are articles of commerce.

A flow meter 116 measures the flow through the application line 18 to monitor that the recirculation pump is operating properly and that the application line is not obstructed or even plugged.

The application tank 24 is schematically illustrated as tank or vessel having an open top. However, the vessel may be entirely enclosed for sanitary, safety, and other reasons. The size of the vessel 24 may vary depending on the required flow rate to the application nozzles or other manner in which the treatment liquid is applied to the food product or produce. In one non-limiting example, the application tank may have a capacity of from about 10 to about 2000 gallons.

A dilutant is added to the application tank 24 to dilute the treatment chemicals from the containers 16a, 16b, and 16c. Typically, the dilutant is in the form of fresh water that is directed to the application tank via inlet line 26. However other dilutants may be used. An actuating valve 110, controlled by controller 22, is provided to open or close access to the fresh water. A dole valve 111 is controlled by the controller 22 modulate the flow rate of the water to the application tank 24. A flow meter 112 is used to measure the actual flow of the water through the line 26. This information is provided to the controller 22 so that the controller in turn can modulate the dole valve 111.

A float sensor 114 is provided for measuring the level of the treatment liquid within the tank 24. As discussed below, at certain times a significant amount of treatment liquid is used so that the level of the treatment liquid in the tank diminishes. The float sensor can ascertain this situation so that the control system 22 can take rectifying steps or measures.

The treatment liquid applied to the food product or produce that does not remain on the produce may be recovered and routed back to the dosing system 14. Such used treatment fluid may be filtered to remove debris or other foreign materials undesirable components before being returned to the dosing system 14. Also, the concentration of the various treatment chemicals in the spent treatment fluid may be analyzed so as to be able to determine what and how much of the treatment chemicals will need to be added to the recovered treatment fluid to meet the specifications for the treatment fluid.

As discussed above, the recirculation pump 28 continually recirculates the treatment liquid from the application tank 24 past the piston pumps 20a, 20b, and 20c and back into the application tank 24. The recirculation pump 28 may be of any suitable type, and is an article of commerce.

Likewise, the static mixer 30 is an article of commerce, and available from a number of commercial sources.

As noted above, the dosing system 14 is controlled by the control system 22. As schematically illustrated in FIG. 1, the control system 22 includes a central processing unit 120, as well as a memory unit 122 to, among other functions, store data received from flow data 108, flow meter 116, float sensor 114, and other data sources of the dosing system 14. Rather than utilizing a local memory unit 122, or in addition to using a local memory unit 122, the data collected as well as utilized for operation of the dosing system 14 may instead be stored remotely from the location of the treatment system 10.

A user interface 124 in the form of a touchscreen panel or other interface device may be provided to access the data sent to the controller, as well as to input parameters and data for the operation of the dosing system 14. The control system 22 may be in communication with a network system 126, which enables the control system to communicate and share information with other computers. The control system may also control equipment and hardware associated with the treatment system 10 in addition to the dosing system 14.

With respect to the dosing system 14, the control system 22 controls the operation of the piston pumps 20a, 20b, and 20c. The control system 22 also controls the quantity of fresh water supplied to the application tank 24 and further controls the operation of the recirculation pump 28. The control system can also control the actuation and dole valves 110 and 111 in the freshwater line 26. Other components of the dosing system 14 may also be controlled by the controller 22.

The control system can determine the amount of fresh water that needs to be added to the application tank using formulas for the specific chemicals that are programmed into the dosing system. The control system can operate the piston pumps to inject precise amounts of the treatment chemicals and at a precise rate so that a specific desired concentration of each of the treatment chemicals is contained in the treatment liquid within the application tank 24.

In addition, the control system 22 is able to provide a chemical "boost" if needed, and has the potential for machine learning to adjust to the physical readings of the treatment chemicals in the application tank or at the location of application of the treatment liquid on the food product or produce.

A "boost" in the injection of treatment chemicals may be needed after the treatment of a significant quantity of food products, such as produce, contained in transport bins or other storage containers. Some of the treatment liquid will remain within the bins as well as on the produce within the bins. This treatment liquid is not recovered and so is lost to the dosing system. Over time, a lowering of the concentration of the treatment chemicals within the treatment liquid can occur. To counteract this situation, a needed "boost" of the treatment chemicals can be injected in the application line whenever a number of bins of produce have been treated. This event can be monitored by a photo eye that records when the bins have been removed from the treatment location.

Also, at the beginning of a day or shift, the application tank only contains water without any treatment chemicals. After the previous shift, the dosing system would had been flushed and cleaned, as discussed below. Thus, it is necessary to charge the dosing system to the required concentration of the treatment chemicals within the application tank. In this regard, the control system causes the piston pumps to operate at full capacity placing large amounts of the treatment chemical into the application line 18 so as to charge the dosing system as quickly as possible.

It will be understood that the control system 22 can be operated in other manners in addition to those described above so as to operate the dosing system 14 as required. In this regard, the concentrations of the treating chemicals in the application tank 24 can be periodically measured and this information transmitted to the control system 22. The control system 22 can use such information to make any adjustments needed to the application of treatment chemicals into the application line 18. Further, the control system can "learn" the trends in the concentrations of the treatment chemicals within the application tank 24 over time, and can make adjustments to the levels of the treatment chemicals that are injected into the application line 18 so as to maintain the desired concentration of the treatment chemicals within the application tank 24.

As noted above, the dosing system 14 is designed to be conveniently flushed, with all the treatment chemicals in the fluid lines and cylinders of the piston pumps 20 being reclaimed. This can be accomplished by disconnecting the inlet line 66 from the pump cylinder 92 and then disconnecting the pump outlet line 104 from the application line 18 and instead connecting the outlet line to the second quick connect fitting 74 of the container 16. Then, operating the piston pump 20 will cause air to be used to force the treatment chemicals in the cylinder 92 out through the outlet line 104 and back into the container 16. With the cylinder 92 and the outlet line 104 free from the treatment chemical, the dosing system can be easily cleaned, for instance, at the end of a shift or when changing the composition of the treatment chemicals being utilized by the application system 10. It will be appreciated that using separate inlet and outlet lines 66 and 104 to and from the piston pump 20 facilitates being able to flush the treatment chemicals from the piston pump.

While illustrative embodiments have been illustrated and described, it will be appreciated that various changes can be made therein without departing from the spirit and scope of the invention. For example, if needed to maintain a minimum temperature level so that a treatment chemical is kept to a low enough viscosity to be flowable, components of the dosing system can be insulated. For example, an insulating blanket or layer 130 is wrapped around container 16c. Likewise, an insulating sleeve 132 can be used to encase the application line 18, and cylinder 92c may be encased in a layer of insulation 134, see FIG. 1.

The embodiments of the invention in which an exclusive property or privilege is claimed are defined as follows:

1. A dosing system for applying at least one treatment liquid to food products, comprising:
   a piston pump connected in liquid flow communication with a source of treatment liquid, the piston pump also connected in liquid flow communication with an application system for applying the treatment liquid to the produce;
   a control system for controlling the operation of the piston pump to pump a selected amount of the treatment liquid from the source of treatment liquid to the application system;
   further comprising an application vessel to receive the treatment liquid from the piston pump; and
   further comprising a recirculation pump in communication with an application line to circulate treatment liquid from one location of the application vessel to another location of the application vessel.

2. The dosing system according to claim 1, further comprising a flow control valve between the source of treatment liquid and the piston pump.

3. The dosing system according to claim 1, further comprising a flow control valve between the piston pump and the application system.

4. The dosing system according to claim 1, further comprising a water source for supplying water to the application vessel for dilution of the treatment liquid received from the piston pump.

5. The dosing system according to claim 1, further comprising an application pump for pumping the treatment fluid from the application vessel to the food product being treated.

6. The dosing system according to claim 1, further comprising a mixing apparatus in communication with the application line for mixing the treatment liquid flowing through the application line.

7. The dosing system according to claim 1, wherein the source of treatment liquid comprises a storage vessel in flow communication with the piston pump.

8. The dosing system according to claim 1, further comprising:
   a plurality of piston pumps, each connected in liquid flow communication with a source of treatment liquid, the piston pumps also each connected in liquid flow communication with the application system; and
   a control system for controlling the operation of the piston pumps to pump a selected amount of the treatment liquid from the source of treatment liquid to the application system.

9. The dosing system according to claim 1, further comprising a linear actuator connected to the piston to reciprocate the piston within the cylinder.

10. The dosing system according to claim 9, further comprising a motor for powering the linear actuator for reciprocal movement.

11. The dosing system according to claim 1, wherein the treatment liquid from the piston pump is in communication with the application line.

* * * * *